(12) United States Patent
Lorey

(10) Patent No.: US 9,566,886 B2
(45) Date of Patent: Feb. 14, 2017

(54) VEHICLE SEAT

(71) Applicant: GRAMMER AG, Amberg (DE)

(72) Inventor: Alexander Lorey, Maxhuette-Haidhof (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/103,427

(22) Filed: Dec. 11, 2013

(65) Prior Publication Data

US 2014/0167470 A1  Jun. 19, 2014

(30) Foreign Application Priority Data

Dec. 12, 2012 (DE) .................. 10 2012 112 138

(51) Int. Cl.
*B60N 2/50* (2006.01)
*B60N 2/16* (2006.01)

(52) U.S. Cl.
CPC ............. *B60N 2/502* (2013.01); *B60N 2/505* (2013.01); *B60N 2/508* (2013.01); *B60N 2/1605* (2013.01)

(58) Field of Classification Search
USPC .................................................. 297/344.15
See application file for complete search history.

(56) References Cited

U.S. PATENT DOCUMENTS

| 2,671,631 A | 3/1954 | Fox |
| 2,854,065 A | 9/1958 | Fox |
| 3,338,622 A | 8/1967 | Bachmann |
| 3,572,817 A | 3/1971 | Colautti et al. |
| 3,622,202 A | 11/1971 | Brown |
| 3,659,895 A | 5/1972 | Dresden |
| 4,097,016 A | 6/1978 | Petrucci |
| 4,169,625 A | 10/1979 | Petersen |
| 4,316,631 A * | 2/1982 | Lenz et al. .............. 297/284.1 |

(Continued)

FOREIGN PATENT DOCUMENTS

| CA | 2337695 | 8/2001 |
| CN | 202480912 | 10/2012 |

(Continued)

OTHER PUBLICATIONS

Extended Search Report for European Patent Application No. 13196308.4, dated Apr. 15, 2014, 7 pages.

(Continued)

*Primary Examiner* — David E Allred
(74) *Attorney, Agent, or Firm* — Sheridan Ross P.C.

(57) ABSTRACT

The invention relates to a vehicle seat, comprising a vertically adjustable seat connection arranged between and mechanically interconnecting an upper seat part and a lower seat part. At least one oscillation limiting device is provided to limit a vertical oscillation movement of the upper seat part in a direction away from the lower seat part, is arranged between the lower seat part and the upper seat part, and is rigidly connected to the upper seat part. The oscillation limiting device comprises at least one reel-off element with a presettable reel-off length that determines a maximum deflection height in the vertical direction. The oscillation limiting device limits movement of the upper seat part in the vertical direction, in the direction away from the lower seat part, after reel-off of the presettable reel-off length, without damping.

12 Claims, 6 Drawing Sheets

(56) References Cited

U.S. PATENT DOCUMENTS

| | | | |
|---|---|---|---|
| 4,330,160 A | 5/1982 | Stolz et al. | |
| 4,344,597 A | 8/1982 | Eimen | |
| 4,401,287 A | 8/1983 | Moeser | |
| 4,570,997 A | 2/1986 | Tanizaki et al. | |
| 4,588,314 A | 5/1986 | Anscher | |
| 4,722,617 A | 2/1988 | Stella et al. | |
| 4,792,188 A | 12/1988 | Kawashima | |
| 4,834,452 A | 5/1989 | Goodrich | |
| 4,971,392 A | 11/1990 | Young | |
| 5,039,164 A | 8/1991 | Gibbs | |
| 5,042,864 A | 8/1991 | Mochizuki | |
| 5,161,765 A | 11/1992 | Wilson | |
| 5,292,179 A | 3/1994 | Forget | |
| 5,395,157 A | 3/1995 | Rollo et al. | |
| 5,437,494 A | 8/1995 | Beauvais | |
| 5,518,294 A * | 5/1996 | Ligon et al. | 297/284.4 |
| 5,568,960 A | 10/1996 | Oleson et al. | |
| 5,580,129 A | 12/1996 | Findlay | |
| 5,690,385 A | 11/1997 | Feldman et al. | |
| 5,704,729 A | 1/1998 | Carnahan et al. | |
| 5,720,462 A | 2/1998 | Brodersen | |
| 5,779,309 A | 7/1998 | Lu | |
| 5,853,221 A | 12/1998 | Thoman et al. | |
| 5,882,076 A | 3/1999 | Garelick et al. | |
| 5,906,441 A | 5/1999 | Seki | |
| 5,975,508 A | 11/1999 | Beard | |
| 6,021,989 A | 2/2000 | Morita et al. | |
| 6,079,786 A | 6/2000 | Kirkland et al. | |
| 6,158,300 A * | 12/2000 | Klingler | 74/526 |
| 6,164,722 A | 12/2000 | Mabey | |
| 6,264,163 B1 * | 7/2001 | Ivarsson | B60N 2/501 248/550 |
| 6,325,456 B1 | 12/2001 | Carnahan | |
| 6,402,114 B1 | 6/2002 | Carnahan et al. | |
| 6,447,065 B1 | 9/2002 | Ropp | |
| 6,557,919 B2 | 5/2003 | Suga et al. | |
| 6,575,420 B2 | 6/2003 | Yoshida et al. | |
| 6,722,737 B2 | 4/2004 | Kanai | |
| 6,877,811 B1 | 4/2005 | Garelick | |
| 7,036,883 B1 | 5/2006 | Thompson et al. | |
| 7,108,325 B2 | 9/2006 | Williamson et al. | |
| 7,121,608 B2 | 10/2006 | Billger et al. | |
| 7,140,685 B2 | 11/2006 | Gardner | |
| 7,328,952 B2 | 2/2008 | Guerrini | |
| 7,506,932 B2 * | 3/2009 | Bostrom et al. | 297/344.15 |
| 7,520,567 B2 | 4/2009 | Billger et al. | |
| 7,575,206 B2 * | 8/2009 | Meier | B60N 2/002 248/157 |
| 7,845,703 B2 | 12/2010 | Panzarella et al. | |
| 7,950,740 B2 | 5/2011 | Bunea et al. | |
| 8,033,589 B2 | 10/2011 | Kusanagi et al. | |
| 8,485,600 B2 * | 7/2013 | Forsman | B60N 2/4221 296/68.1 |
| 8,783,772 B2 * | 7/2014 | Schuler | B60N 2/502 297/344.15 |
| 9,073,463 B2 * | 7/2015 | Kuriyama | B60N 2/1685 |
| 9,085,245 B2 | 7/2015 | Haller | |
| 2002/0130528 A1 * | 9/2002 | Mans | B60N 2/4214 296/68.1 |
| 2002/0149250 A1 | 10/2002 | Silvia | |
| 2002/0190560 A1 * | 12/2002 | Kohl et al. | 297/344.12 |
| 2003/0189370 A1 | 10/2003 | Hemmer et al. | |
| 2004/0066074 A1 | 4/2004 | Ovitt | |
| 2004/0112659 A1 | 6/2004 | Kramer et al. | |
| 2004/0188582 A1 * | 9/2004 | Flynn et al. | 248/329 |
| 2004/0212242 A1 | 10/2004 | Gryp et al. | |
| 2004/0232399 A1 * | 11/2004 | Stone | 254/391 |
| 2006/0226685 A1 | 10/2006 | Priepke et al. | |
| 2007/0196038 A1 | 8/2007 | Haepp | |
| 2008/0031560 A1 | 2/2008 | Fukuda | |
| 2008/0211284 A1 | 9/2008 | Mutou et al. | |
| 2009/0102271 A1 * | 4/2009 | Squires et al. | 297/477 |
| 2009/0284061 A1 | 11/2009 | Maier et al. | |
| 2010/0001169 A1 | 1/2010 | Armo et al. | |
| 2010/0117413 A1 * | 5/2010 | Squires | 297/217.1 |
| 2010/0117428 A1 * | 5/2010 | Deml et al. | 297/344.15 |
| 2010/0219009 A1 | 9/2010 | Turco et al. | |
| 2010/0244420 A1 | 9/2010 | Scarf | |
| 2011/0074198 A1 | 3/2011 | Iwasaki et al. | |
| 2011/0163586 A1 | 7/2011 | Findlay | |
| 2012/0237151 A1 | 9/2012 | Felis | |
| 2012/0305347 A1 | 12/2012 | Mori et al. | |
| 2013/0193729 A1 | 8/2013 | VanMiddendorp et al. | |
| 2014/0167469 A1 | 6/2014 | Haller | |
| 2014/0167471 A1 | 6/2014 | Haller | |
| 2014/0167472 A1 | 6/2014 | Haller | |
| 2014/0217796 A1 | 8/2014 | Haller | |
| 2014/0339869 A1 | 11/2014 | Ott | |
| 2015/0015039 A1 | 1/2015 | Brand et al. | |
| 2015/0035334 A1 | 2/2015 | Roth et al. | |
| 2016/0001685 A1 | 1/2016 | Ulrich et al. | |

FOREIGN PATENT DOCUMENTS

| | | | |
|---|---|---|---|
| DE | 1116987 | 11/1961 | |
| DE | 2828503 | 1/1980 | |
| DE | 3127625 | 6/1982 | |
| DE | 3218379 | 11/1983 | |
| DE | 3708399 | 9/1987 | |
| DE | 4415933 | 11/1994 | |
| DE | 69202551 | 2/1996 | |
| DE | 69721383 | 3/2004 | |
| DE | 60118068 | 8/2006 | |
| DE | 202006010184 | 9/2006 | |
| DE | 102006037068 | 2/2008 | |
| DE | 102007021141 | 9/2008 | |
| DE | 102008058409 A1 | 7/2009 | |
| DE | 102010017328 | 12/2011 | |
| DE | 102010053752 A1 | 6/2012 | |
| DE | 102011009543 A1 | 8/2012 | |
| DE | 102012112525 | 6/2014 | |
| EP | 0515275 | 11/1992 | |
| EP | 0921962 | 6/1999 | |
| EP | 1659021 | 5/2006 | |
| EP | 1824358 | 8/2007 | |
| EP | 1924462 | 5/2008 | |
| EP | 2213504 | 8/2010 | |
| EP | 2293959 | 3/2011 | |
| FR | 2201659 | 4/1974 | |
| GB | 525663 | 9/1940 | |
| GB | 2277494 | 11/1994 | |
| JP | 06316233 A * | 11/1994 | B60N 2/54 |
| JP | H10-217811 | 8/1998 | |
| JP | H11-198692 | 7/1999 | |
| JP | 2002-211284 | 7/2002 | |
| JP | 2002-306267 | 10/2002 | |
| JP | 2003-063288 | 3/2003 | |
| JP | 2004-203160 | 7/2004 | |
| KR | 10-2013-0056092 | 5/2013 | |
| WO | WO 2004/056605 | 7/2004 | |
| WO | WO 2007/028473 | 3/2007 | |
| WO | WO 2010/114966 | 10/2010 | |

OTHER PUBLICATIONS

English Translation of Official Action for German Patent Application No. 102012112138.9, dated Aug. 8, 2013, 5 pages.

U.S. Appl. No. 14/726,798, filed Jun. 1, 2015, Haller et al.

* cited by examiner

VEHICLE SEAT

The invention relates to a vehicle seat including a lower seat part as well as a vertically adjustable seat connection unit which is arranged between an upper seat part and the lower seat part which mechanically interconnects the lower seat part and the upper seat part, according to the preamble of claim 1.

A wide variety of vehicle seats with a vertically adjustable seat connection unit arranged between the lower seat part and the upper seat part is known. Within a vehicle, however, a driver's headroom is limited at the top. In addition the distance to the floor and pedals of the vehicle is often too great for small-sized drivers in the event of large rebounds of the vehicle seat.

This is problematic in that, in the event of a maximum rebound of the vehicle seat, for example of a car, the driver can run the risk of striking a ceiling of the vehicle interior and thus receiving, for example, head injuries, owing to the limited headroom. It is also is conceivable that, in the event of a particularly pronounced, for example maximum, rebound of the upper seat part, the driver's legs run the risk of being jammed between the steering wheel and the vehicle seat. If the driver is a rather small person, the maximum rebound of the vehicle seat can cause the driver to lose contact with the floor and the pedals of the vehicle.

It is therefore the object of the invention to provide a vehicle seat in which a presettable limit to the rebound of the vehicle seat can be produced in a particularly simple and inexpensive manner, in order to overcome the aforementioned problems.

In order to provide now a vehicle seat in which the rebound of the vehicle seat is limited and which is both inexpensive and simple in construction, the vehicle seat described herein makes use inter alia of the idea of limiting at least an oscillation limiting device for limiting a vertical oscillation movement of the upper seat part in a direction away from the lower seat part, in other words a rebound or deflection of the vehicle seat. For this purpose the oscillation limiting device comprises at least one reel-off element by means of which the oscillation limiting device is mechanically rigidly fastened on the lower seat part via its free reelable reel-off end of the reel-off element. If the upper seat part should exceed a presettable reel-off length, which is invariably smaller than the maximum rebound of the vehicle seat, the reel-off element limits the rebound of the upper seat part without damping. This prevents large drivers from striking, for example their head, against the ceiling of the vehicle and allows small drivers to always be able to make contact with the vehicle floor and pedals.

According to at least one embodiment, the vehicle seat comprises a lower seat part as well as a vertically adjustable seat connection unit which is arranged between an upper seat part and the lower seat part which mechanically interconnects the lower seat part and the upper seat part. In addition the vehicle seat comprises at least one oscillation limiting device for limiting a vertical oscillation movement of the upper seat part in a direction away from the lower seat part, which is arranged between the lower seat part and the upper seat part and is rigidly connected to the upper seat part, wherein the oscillation limiting device comprises at least one reel-off element which is mechanically rigidly fastened on the lower seat part by its free reelable reel-off end. The reel-off element has a presettable reel-off length, and the reel-off length determines a maximum deflection height in the vertical direction of the upper seat part, in the direction away from lower seat part, wherein the oscillation limiting device is equipped and intended to limit movement of the upper seat part in the vertical direction, in the direction away from the lower seat part, after reel off of the presettable reel-off length, without damping.

According to at least one embodiment, the vehicle seat comprises a lower seat part as well as a vertically adjustable seat connection unit which is arranged between an upper seat part and the lower seat part which mechanically interconnects the lower seat part and the upper seat part. In particular the seat connection unit can be a cushioning unit which damps a deflection of the upper seat part in the direction towards the lower seat part and/or in the direction away from the lower seat part.

According to at least one embodiment the vehicle seat comprises at least one oscillation limiting device for limiting a vertical oscillation movement of the upper seat part, in a direction away from the lower seat part. The oscillation limiting device in this case is arranged between the lower seat part and the upper seat part and is rigidly connected to the upper seat part. "Rigidly" in this connection means that the oscillation limiting device is, for example, detachably screwed to the upper seat part or otherwise integrated in the upper seat part. In other words, the oscillation limiting device limits a deflection in the direction away from the lower seat part and therefore acts as a height limiter for the upper seat part relative to the lower seat part.

According to at least one embodiment the oscillation limiting device comprises at least one reel-off element which is mechanically rigidly fastened on the lower seat part by its free reelable reel-off end. For this purpose the reel-off element is, for example, detachably caught and/or knotted in a hooking device of the lower seat part. The other respective end of the reel-off element remains rigidly connected to the oscillation limiting device in this arrangement, so the lower seat part and the upper seat part are interconnected via the reel-off element after at least partial reel-off of the reel-off element. Preferably the reel-off element limits movement in the vertical direction of the upper seat part only in the direction away from the lower seat part. In particular, the reel-off element can be compressed and/or can be reeled in during a vertical movement of the upper seat part in the direction towards the lower seat part. The term "vertical direction" in this case refers to a direction perpendicular to a main extension plane of the lower seat part.

According to at least one embodiment the reel-off element has a presettable reel-off length, wherein the reel-off length determines a maximum deflection height of the upper seat part in the vertical direction, in the direction away from the lower seat part. In other words, the presettable reel-off length is a maximum deflection of the upper seat part relative to the lower seat part in the direction away from lower seat part. The reel-off length therefore defines a vertical deflection of the upper seat part.

According to at least one embodiment the oscillation limiting device is equipped and intended to limit movement of the upper seat part in the vertical direction, in the direction away from the lower seat part, after reel off of the presettable reel-off length, without damping. "Without damping" in this connection means that, after complete reel-off to the reel-off length, the movement of the upper seat part in the direction away from the lower seat part is halted by the oscillation limiting device, in particular by the reel-off element, without the use of additional damping elements. In other words, the limiting function of the reel-off element is abrupt apart from damping or resilient extensibility inherent or intrinsic in the reel-off element itself.

According to at least one embodiment the reel-off element is formed by a reelable belt which can be reelably wound or unwound about a reel-off axis on a reel-off cylinder for the reel-off element. The belt is, for example, a vehicle belt. A reel-off element of this type can be of particularly simple and inexpensive construction. For this purpose the belt end can simply be connected to the lower seat part, whereby the reel-off element is reeled off at least in part. If the upper seat part moves together with the oscillation limiting device in the direction away from the lower seat part, belt begins to unroll to the reel-off length.

According to at least one embodiment the oscillation limiting device comprises a torsion spring which is equipped and intended to load the reel-off cylinder with a torque which counteracts the vertical movement of the upper seat part in the direction away from the lower seat part. For this purpose the torsion spring can be introduced into the reel-off cylinder in parallel with the reel-off axis or can be operatively arranged in the reel-off cylinder, the reel-off element preferably being continuously tensioned, for example in the case of a belt, by means of the torque. In other words adjustment of the torque by means of the torsion spring prevents the belt from extending loosely between the upper seat part and the lower seat part during resilient movements. During movement of the upper seat part in the direction of the lower seat part, the torque also enables the belt to be reeled up by the reel-off cylinder and to unreel to the presettable reel-off length again during the reverse movement of the upper seat part in the direction away from the lower seat part. In this respect, a belt pre-tensioner can be produced.

According to at least one embodiment the oscillation limiting device comprises an adjusting means which is equipped and intended to presettably adjust the reel-off length and to limit it without damping. Advantageously the reel-off length can be adapted, in other words adjusted, as individually as possible to the requirements of each driver and his size by means of the adjusting means which, for example, intervenes in the reel-off and/or reel-in process of the reel-off cylinder.

According to at least one embodiment the adjustment element comprises a bias spring and a catchable grip, wherein the bias spring applies tension or pressure to the grip along an adjustment axis of the adjusting means. The grip can be operated in a closed mode and in an open mode along the adjustment axis by application of an external tension or pressure onto the grip in the direction towards or away from the bias spring in this case. In the open mode the reel-off length is adjustable and in the closed mode the reel-off length is fixed by catching of the grip in a catch device. The term "external tension or pressure" refers to a pressure exerted on the grip, for example by a driver, and thus in particular not by the bias spring. Preferably the adjusting means also includes the catch device. For adjusting a maximum deflection of the upper seat part relative to the lower seat part it is conceivable that the driver initially places himself with his weight on the upper seat part and meanwhile pulls the pressure-loaded grip initially into the open mode in the direction away from himself so that the reel-off element is freed and the belt, for example, automatically reels in to a desired reel-off length according to the weight or pressure of the driver owing to the torque. Once the reel-off length has been determined, the grip can be caught by the driver, for example by compression of the bias spring, that is to say by pressing the grip in the direction of the bias spring. If the bias spring applies a tension to the grip in the open mode, the grip can simply be released once the desired reel-off length has been adjusted and can automatically catch in the closed mode. Owing to the catching of the grip, the reel-off length can be fixed via the catch device.

According to at least one embodiment the oscillation limiting device comprises a mount in which the reel-off element and the adjusting means are arranged, wherein in the mount the reel-off element is guided rotatably in the reel-off axis, and the adjusting means is arranged so as to be capable of engaging in the reel-off element. Preferably the mount is a single-piece element by means of which both the reel-off element and the adjusting means are rigidly interconnected. In other words the mount functions both as a holder for the adjusting means and the reel-off element, and also preferably for fastening the entire oscillation limiting device on the upper seat part.

According to at least one embodiment the seat connection unit is formed by a scissor-action frame comprising at least two scissor arms. A scissor-action frame of this type can be produced particularly simply and inexpensively and suffers minimal wear.

The driver's seat described herein will be described in more detail in the following by means of an embodiment and the associated drawings.

In the embodiments and in the drawings, like or similarly acting components are provided with like reference numerals. The illustrated elements are not drawn to scale, but rather individual elements are magnified for the sake of clarity.

Figure 1:
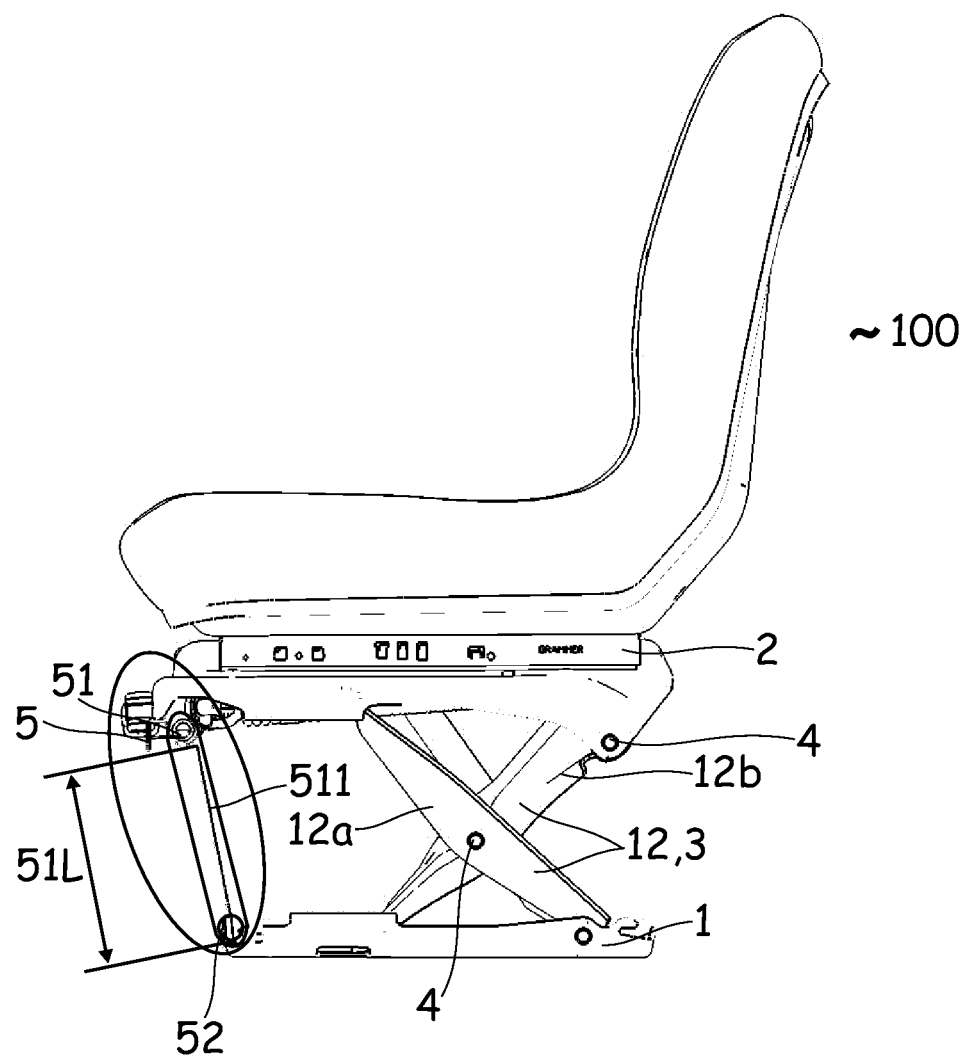
FIGS. 1, 2, 3 and 4 are different perspective views of an embodiment of a vehicle seat claimed herein.

FIG. 1 is a schematic side view of a vehicle seat 100 described herein comprising a lower seat part 1 and a vertically adjustable scissor-action frame 12 arranged as a seat connection unit 3 between an upper seat part 2 and the lower seat part 1. The scissor-action frame 12 is mechanically rigidly connected to the lower seat part 1 and the upper seat part 2 at assembly points 4 in this case. The scissor-action frame 12 comprises two scissor arms 12a, 12b. In addition the vehicle seat 100 includes an oscillation limiting device 5 for limiting a vertical oscillation movement of the upper seat part 2 in a direction away from the lower seat part 1. The oscillation limiting device 5 in this case is arranged between the lower seat part 1 and the upper seat part 2 and is rigidly connected to the upper seat part 2. The oscillation limiting device 5 comprises a reel-off element 51 which is mechanically rigidly fastened on the lower seat part 1 by its free reelable reel-off end 52. The reel-off element 51 is a belt 511, which is wound in part about a reel-off axis 51A so that it can be reeled off and on to a reel-off cylinder 512 of the reel-off element 51. The reel-off element 51, in particular the belt 511, is unwound by a presettable reel-off length 51L. The presettable reel-off length 51L is thus a maximum deflection height in the vertical direction of the upper seat part 2. If the upper seat part 2 is deflected to a maximum in the direction away from lower seat part 1 during travel, the belt 511 limits the deflection without damping, in other words abruptly, before the upper seat part 2 has reached a maximum deflection owing to the scissor-action frame 12.

In addition the oscillation limiting device 5 comprises a torsion spring 6. By means of the torsion spring 6, which is arranged so as to be able to engage with the reel-off cylinder 512, the reel-off cylinder 512 is loaded with a torque which counteracts the vertical movement of the upper seat part 2 in the direction away from the lower seat part 1. The belt 511 is continuously biased when a torque of this type is applied to the reel-off cylinder 512, and this prevents the belt from hanging loosely during deflection, in other words during a movement of the upper seat part 2 in the direction of the lower seat part 1.

Figure 2:
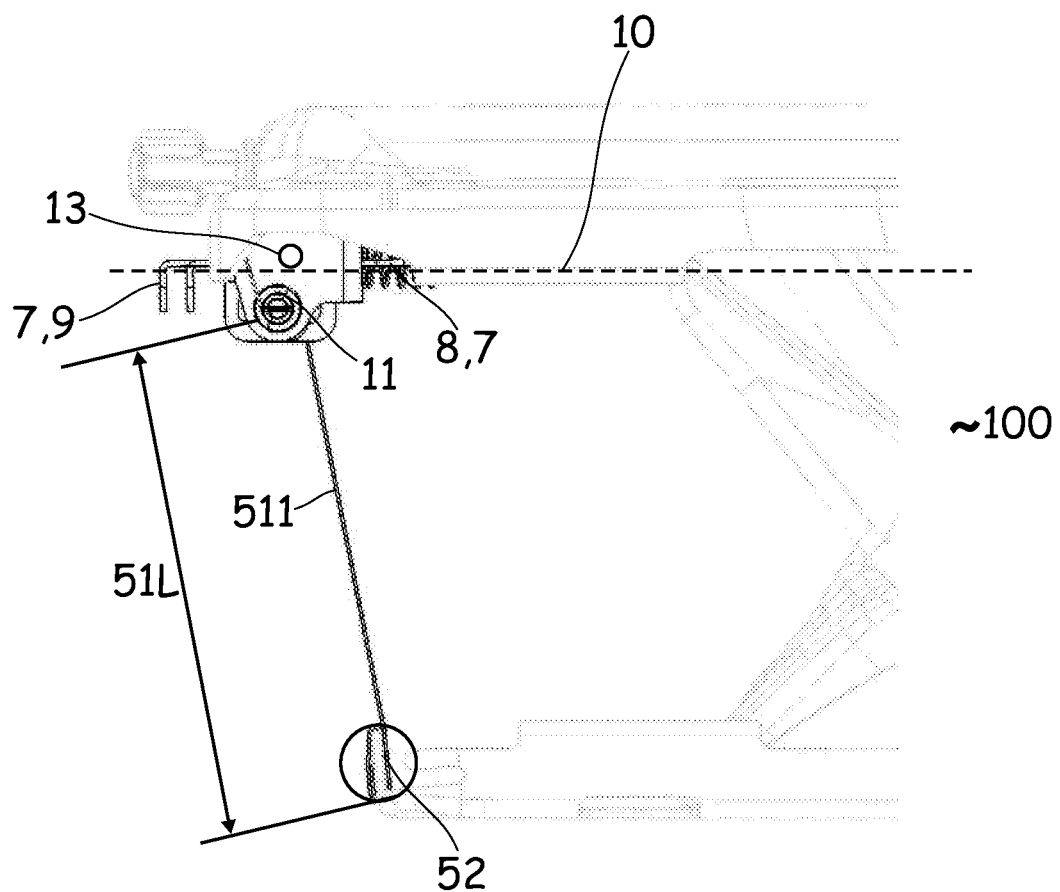

FIG. 2 shows more clearly a detail of the vehicle seat 100 according to FIG. 1, in particular the oscillation limiting device 5 arranged therein. It can be seen that the oscillation limiting device 5 comprises an adjusting means 7 by means of which the reel-off length 51L can be adjusted in a presettable manner. The adjusting means 7 includes a bias spring 8 and a catchable grip 9, the bias spring 8 applying tension to the grip 9 in a direction towards itself, along an adjustment axis 10 of the adjusting means 7. The grip 9 is operable from a closed mode 91 to an open mode 92 along the adjustment axis 10 by application of an external tension or pressure in the direction away from the bias spring 8, the reel-off length 51L being adjustable in the open mode 92 and the reel-off length 51L being fixed by catching of the grip 9 in a catch device 11 in the closed mode. In the present case the catch device 11 is a component of the oscillation limiting device 5. For adjusting the reel-off length 51L, the driver can initially place himself on the upper seat part 2 so that it moves in the direction of the lower seat part 1. During the next step, the grip 9 can be pulled out into the open mode 92. The catching of the catch device 11 on the reel-off cylinder 512 is released by pulling out the grip 9, so that the reel-off cylinder 511 is freed and the reel-off cylinder 512 reels up the belt 511 via the torque. Once a desired reel-off length 51L is achieved, the grip 9 can be pressed in the direction of the bias spring 8 and be brought in to closed mode 91. In other words the catch device 11 is caught in the reel-off cylinder 512 in the closed mode 91. This leads to particularly simple and inexpensive implementation of the adjustment of the reel-off length 51.

Figure 3:
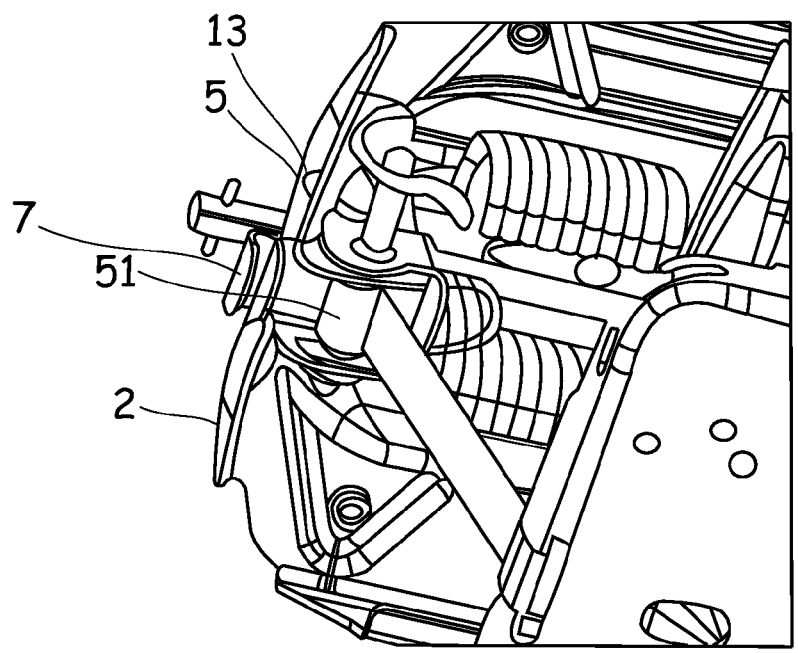
Figure 4:
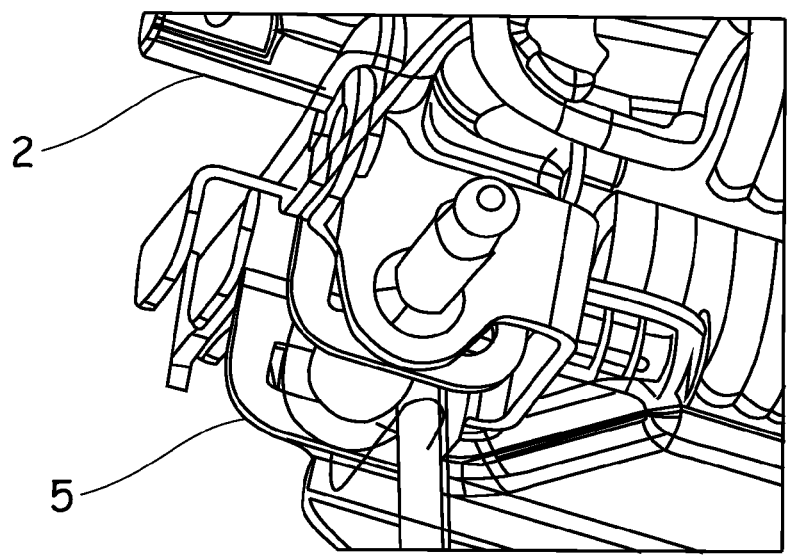

FIGS. 3 and 4 are schematic perspective bottom views of the oscillation limiting device 5 from FIGS. 1 and 2. It can now be seen that the oscillation limiting device 5 comprises a mount 13 in which the reel-off element 51 and the adjusting means 7 are arranged and mounted. The reel-off element 51 is guided rotatably in the mount 13 in the reel-off axis 51A, the adjusting means 7 being able to engage in the reel-off element 51. It can again be seen that the grip 9 is movable along the adjustment axis 10, which, in the present case, extends in a horizontal direction, perpendicularly to the reel-off axis 51A. The entire oscillation limiting device 5 is rigidly connected to the upper seat part 2 via the mount 13.

Figure 5:
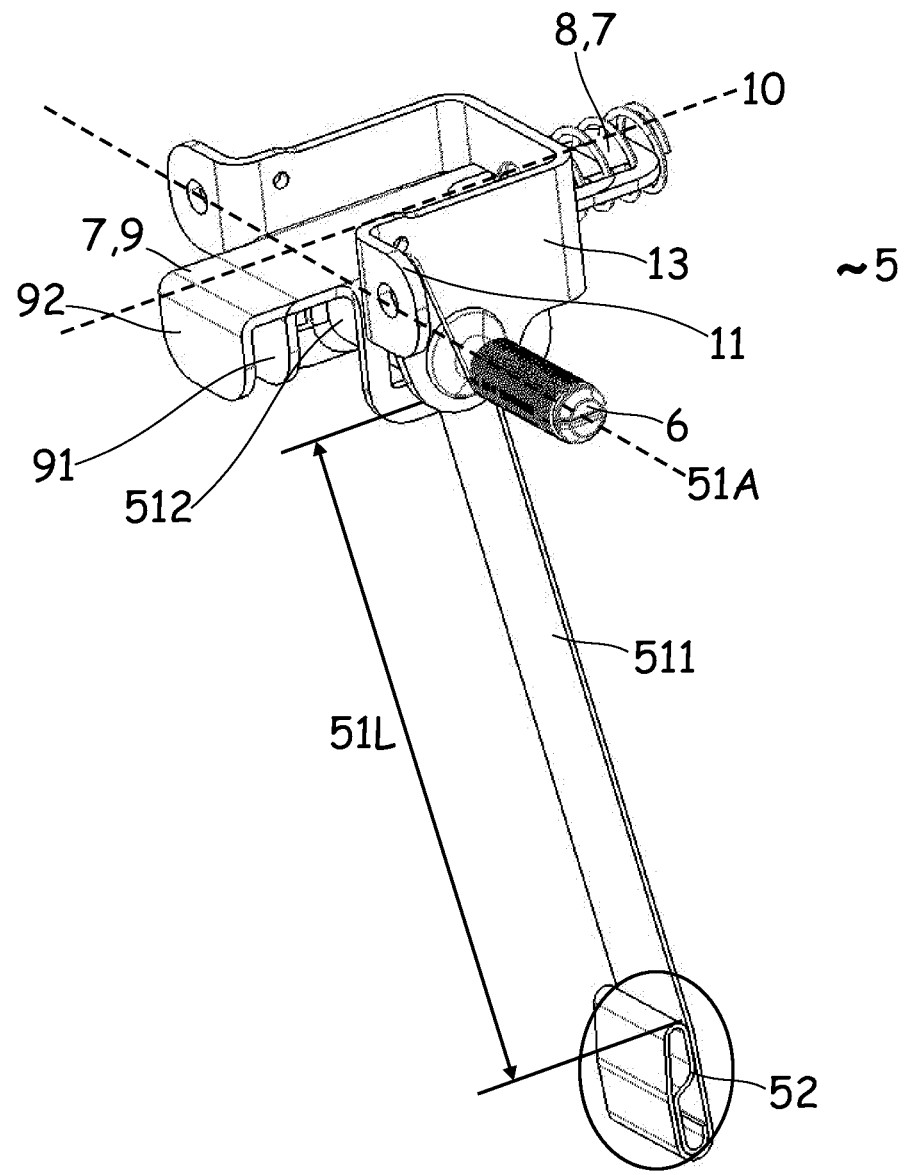
FIGS. 5, 6 and 7 are different perspective views of an embodiment of an oscillation limiting device described herein.
Figure 6:
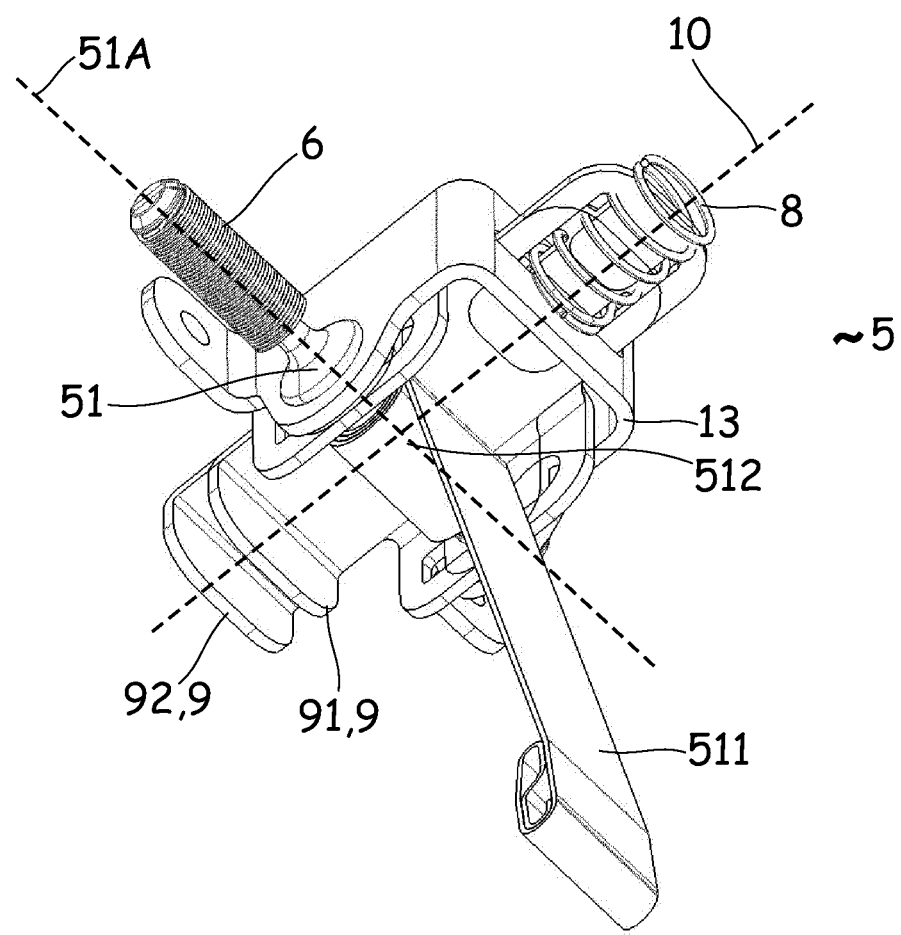

FIGS. 5 and 6 are two further perspective views of the oscillation limiting device 5 shown in all the preceding drawings. These drawings show, in a particularly simple manner, the reel-off cylinder 512 via which the belt 511 is reelable.

Figure 7:
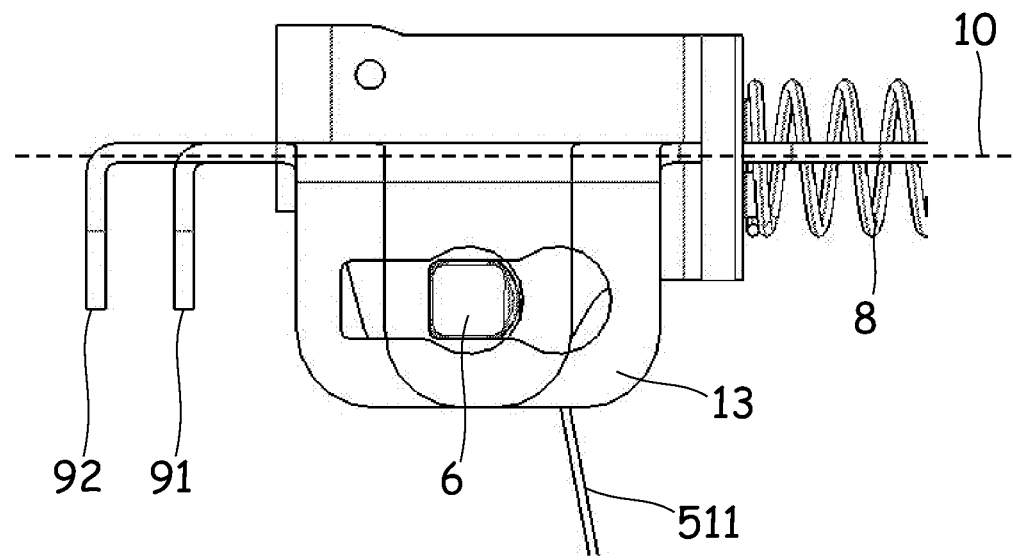

FIG. 7 is a further schematic side view of this oscillation completing device 5. It is clear here that the grip 9 can be brought from the open mode 92 to the closed mode 91 by compression of the bias spring 8 by means of the movement of the grip 9 along the adjustment axis 10.

The invention is not restricted by the description and embodiments. Rather the invention comprises any new feature and combination of features which, in particular, contains any combination of features in the claims, even if this feature or this combination is not explicitly mentioned itself in the claims or in the embodiments.

All features disclosed in the application documents are claimed as being essential to the invention insofar as they are novel, individually or in combination, over the prior art.

LIST OF REFERENCE NUMERALS

1 lower seat part
2 upper seat part
3 seat connection unit
4 assembly points
5 oscillation limiting device
51 reel-off element
51A reel-off axis
51L reel-off length
511 belt
512 reel-off cylinder
6 torsion spring
7 adjusting means
8 bias spring
9 grip
91 closed mode
92 open mode
10 adjustment axis
11 catch device
12 scissor-action frame
12a, 12b scissor arms
13 mount
100 vehicle seat

The invention claimed is:

1. A vehicle seat, comprising:
    a lower seat part;
    an upper seat part;
    a vertically adjustable seat connection unit which is arranged between the upper seat part and the lower seat part and which mechanically interconnects the lower seat part and the upper seat part, wherein the seat connection unit is formed by a scissor-action frame comprising at least two scissor arms;
    at least one oscillation limiting device arranged between the lower seat part and the upper seat part and rigidly connected to the upper seat part, wherein the oscillation limiting device comprises a mount, a reel-off cylinder rotatably interconnected to the mount on an axis of the reel-off cylinder, and a belt disposed about the reel-off cylinder, wherein the belt has a free end which is mechanically rigidly fastened on the lower seat part,
    wherein the belt has a presettable reel-off length, and wherein the oscillation limiting device is operable to limit a movement of the upper seat part to a maximum deflection height in a vertical direction, in a direction away from the lower seat part, after reel-off of the presettable reel-off length, without damping,
    an adjusting means operably interconnected to the mount and configured to adjust the presettable reel-off length of the belt, wherein the adjusting means comprises a bias spring and a manually operated catchable grip slidably supported on the mount for sliding movement along an adjustment axis,
    wherein the bias spring biases the grip along the adjustment axis of the adjusting means to a closed mode, which engages the grip with the reel-off cylinder and prevents rotation of the reel-off cylinder to set the presettable reel-off length of the belt, and
    wherein application of an external tension or pressure onto the grip moves the grip against the bias spring and along the adjustment axis of the adjusting means to an open mode, which allows free rotation of the reel-off cylinder and adjustment of the presettable reel-off length of the belt.

2. The vehicle seat according to claim 1, wherein the oscillation limiting device comprises a torsion spring which is operable to load the reel-off cylinder with a torque which counteracts the vertical movement of the upper seat part in the direction away from the lower seat part.

3. The vehicle seat according to claim 1, wherein the grip of the adjusting means comprises a side wall having a channel extending in the direction of the adjustment axis of the adjusting means, the channel having a first portion and a second portion, wherein a shaft defining the axis of the reel-off cylinder is positioned in the first portion of the channel when the grip is in the closed mode, and wherein the shaft defining the axis of the cylinder is positioned in the second portion of the channel when the grip is in the open mode.

4. The vehicle seat according to claim 3, wherein the first portion of the channel has a predetermined channel width, and the second portion of the channel has a circular shape with a predetermined channel diameter.

5. The vehicle seat according to claim 4, wherein the shaft defining the axis of the reel-off cylinder has a square cross section, wherein a side of the square cross section is smaller than the predetermined channel width, and a diagonal dimension of the square cross section is larger than the predetermined channel width such that the shaft defining the axis of the reel-off cylinder does not rotate in the first portion of the channel, and wherein the diagonal dimension of the square cross section is smaller than the predetermined diameter such that the shaft defining the axis of the reel-off cylinder rotates in the second portion of the channel.

6. A vehicle seat comprising:
a lower seat part extending in a lower plane;
an upper seat part extending in an upper plane that is distinct from said lower plane;
a vertically adjustable seat connection unit which is arranged between the upper seat part and the lower seat part and which mechanically interconnects the lower seat part and the upper seat part;
at least one oscillation limiting device wherein the oscillation limiting device is operable to limit a vertical oscillation movement of the upper seat part in a direction away from the lower seat part, wherein the oscillation limiting device is arranged between the lower seat part and the upper seat part and is rigidly connected to the upper seat part;
wherein the oscillation limiting device comprises at least one belt which is mechanically rigidly fastened on the lower seat part by its free reelable reel-off end, wherein a non-free end of the at least one belt is disposed about a reel-off cylinder that is rotatable about an axis;
wherein the oscillation limiting device substantially extends in a limiting plane that is distinct from the lower plane and the upper plane;
wherein the belt has a presettable reel-off length, and the presettable reel-off length determines a maximum deflection height in a vertical direction of the upper seat part, in the direction away from the lower seat part; and
wherein the oscillation limiting device is operable to limit a movement of the upper seat part in the vertical direction, in the direction away from the lower seat part, after reel-off of the presettable reel-off length, without damping;
wherein the oscillation limiting device comprises an adjusting means which is operable to presettably adjust the presettable reel-off length and to limit it without damping, and wherein the adjusting means comprises a bias spring and a manually operated catchable grip slidably supported for sliding movement relative to the reel-off cylinder,
wherein the bias spring biases the grip along an adjustment axis of the adjusting means to a closed mode, which engages the grip with the reel-off cylinder and prevents rotation of the reel-off cylinder to set the presettable reel-off length of the belt; and
wherein application of an external tension or pressure onto the grip moves the grip against the bias spring and along the adjustment axis of the adjusting means to an open mode, which allows free rotation of the reel-off cylinder and adjustment of the presettable reel-off length of the belt.

7. The vehicle seat according to claim 6, wherein the oscillation limiting device comprises a torsion spring which is operable to load the reel-off cylinder with a torque which counteracts the vertical movement of the upper seat part in the direction away from the lower seat part.

8. The vehicle seat according to claim 6, wherein the oscillation limiting device comprises a mount in which the belt and the adjusting means are arranged, wherein in the mount the belt is guided rotatably about the reel-off axis.

9. The vehicle seat according to claim 6, wherein the seat connection unit is formed by a scissor-action frame comprising at least two scissor arms.

10. The vehicle seat according to claim 6, wherein the grip of the adjusting means comprises a side wall having a channel extending in the direction of the adjustment axis of the adjusting means, the channel having a first portion and a second portion, wherein a shaft defining the axis of the reel-off cylinder is positioned in the first portion of the channel when the grip is in the closed mode, and wherein the shaft defining the axis of the cylinder is positioned in the second portion of the channel when the grip is in the open mode.

11. The vehicle seat according to claim 10, wherein the first portion of the channel has a predetermined channel width, and the second portion of the channel has a circular shape with a predetermined channel diameter.

12. The vehicle seat according to claim 11, wherein the shaft defining the axis of the reel-off cylinder has a square cross section, wherein a side of the square cross section is smaller than the predetermined channel width, and a diagonal dimension of the square cross section is larger than the predetermined channel width such that the shaft defining the axis of the reel-off cylinder does not rotate in the first portion of the channel, and wherein the diagonal dimension of the square cross section is smaller than the predetermined diameter such that the shaft defining the axis of the reel-off cylinder rotates in the second portion of the channel.

* * * * *